United States Patent [19]
Buchholz et al.

[11] Patent Number: 5,888,549
[45] Date of Patent: *Mar. 30, 1999

[54] COFFEE AND PROCESS FOR THE PRODUCTION THEREOF

[75] Inventors: Klaus Buchholz, Hamburg; Claus F. Gosswein, Buchholz; Michael Ball, Halstenbek; Peter Hubert, Buxtehude; Reiner Kopsch, Schenefeld; Henning Lutz, Halstenbek, all of Germany

[73] Assignee: Code Kaffee-Handelsges, mbH, Germany

[ * ] Notice: The portion of the term of this patent subsequent to Apr. 12, 2006, has been disclaimed.

[21] Appl. No.: 79,353

[22] Filed: Jun. 21, 1993

Related U.S. Application Data

[63] Continuation of Ser. No. 827,572, Jan. 29, 1992, abandoned, which is a continuation of Ser. No. 123,852, Apr. 19, 1989, abandoned.

[30] Foreign Application Priority Data

Feb. 6, 1986 [DE] Germany ............... 36 03 575.0

[51] Int. Cl.[6] .................................................. A23F 5/14
[52] U.S. Cl. ................................. 426/594; 426/595
[58] Field of Search ...................... 426/594, 595

[56] References Cited

U.S. PATENT DOCUMENTS

| 2,198,207 | 4/1940 | Musher . | |
|---|---|---|---|
| 3,924,017 | 12/1975 | Lee et al. | 426/548 |
| 4,409,253 | 10/1983 | Morrison et al. | 426/424 |
| 4,798,732 | 1/1989 | Osawa | 426/594 X |
| 4,865,847 | 9/1989 | Gosswein | 424/475 X |

FOREIGN PATENT DOCUMENTS

| 1203111 | 4/1986 | Canada . |
| 0003898 | 3/1980 | European Pat. Off. . |
| 0008398 | 3/1980 | European Pat. Off. . |
| 0078088 | 5/1983 | European Pat. Off. . |
| 0107171 | 5/1984 | European Pat. Off. . |
| 0108038 | 5/1984 | European Pat. Off. . |
| 0256104 | 2/1988 | European Pat. Off. . |
| 676752 | 2/1930 | France . |
| 685367 | 11/1939 | Germany . |
| 3119277 | 4/1982 | Germany . |
| 455902 | 12/1939 | United Kingdom . |

OTHER PUBLICATIONS

Schunemann et al., Zur Spezifitat Photometrischer Chlorogensaure–Bestimmungen Im Kaffee; Deutsche Lebensmittel–Rundschau, 82 Jahrgang, Heft 3, pp. 73–76 (1986).

Shunemann et al., Zur Spezifitat Photometrischer Chlorogensaure–Bestimmungen Im Kaffee; Deutsche Lebensmittel–Rundschau, 82 Jahrg, Heft 3, pp. 73–76 (2986).

Lehmann, et al. Uber Den Cylorogensauregehalt Des Rohkaffees, Rostkaffees Und Kaffee–Extrakt–Pulvers; Deutsche Lebensmittel–Rundchau, 63 Jahrg, Heft 9/63, pp. 273–275, (1967).

Von G. Lehmann, Physiologisch Wichtige Inhaltsstoffe Des Kaffee; Institut for Organische Chemie der Universitat des Saarlandes/Saarbrucken, pp. 43–47, (1971).

Lehmann et al., Methoden Zur Quantitativen Bestimmung Der Chlorogensaure; Deutsche Lebensmittel–Rundschau, Heft 5, pp. 144–151, (1967).

Clarke et al., Coffee; *Chemistry*, vol. 1 Elsevier Publishers: London, pp. 156–157, 180–181,188–189, 191–195, 200–203 (1985).

Schunemann, et al., Zur Spezifitat Photometrischer Chlorogensaure–Bestimmungen Im Kaffee; Deutsche Lebensmittel–Rundschau, 82 Jahrgang, Heft 3, pp. 73–76 (1986).

Lehmann, et al. Uber Den Cylorogensauregehalt Des Rohkaffees, Rostkaffees Und Kaffee–Extrakt–Pulvers; Deutsche Lebensmittel–Rundschau, 63 Jahrg, Heft 9/63, pp. 273–275 (1967).

Von G. Lehmann, Physiologisch Wichtige Inhaltsstoffe Des Kaffees; Institut fur Organische Chemie der Universitat des Saarlandes/Saarbrucken, pp. 43–47 (1971).

Lehmann, et al., Methoden Zur Quantitativen Bestimmung Der Chlorogensaure; Deutsche Lebensmittel–Rundschau, Heft 5, pp. 144–151, (1967).

Clarke, et al., Coffee; *Chemistry*, vol. 1, Elsevier Applied Science Publisher: London, pp. 156–157, 180–181, 188–189, 191–195, 200–203, (1985).

*Primary Examiner*—Joseph Golian
*Attorney, Agent, or Firm*—Cushman Darby & Cushman, L.L.P.

[57] ABSTRACT

Roasted coffee with an increased chlorogenic acid content of more than 2.8% by weight or instant coffee powder with an increased chlorogenic acid content of more than 8.5% by weight have a better compatibility. The increased chlorogenic acid content is achieved either by adding chlorogenic acid or by extracting raw coffee and adding the optionally concentrated extract to the roasted coffee.

14 Claims, No Drawings

COFFEE AND PROCESS FOR THE PRODUCTION THEREOF

This is a continuation of application Ser. No. 07/827,572, filed on Jan. 29, 1992, abandoned, which is a continuation of application Ser. No. 07/123,852, filed on Apr. 19, 1989, abandoned.

The invention relates to roasted or instant coffee with an increased chlorogenic acid content, as well as to processes for the production thereof.

Chlorogenic acid is here not only understood to mean the 3-caffeoyl-quinic acid mostly contained in coffee and frequently referred to in the literature as "the chlorogenic acid", but also 4- and 5-caffeoyl-quinic acid, as well as isomeric mixtures.

When roasting raw coffee a considerable weight loss occurs and generally represents approximately 12 to 17% by weight. The loss is not only due to the residual moisture content still present in the raw coffee after drying and which is lost during roasting and in addition various constituents of the raw coffee are evaporated or chemically decomposed during the roasting process and are consequently lost. Chlorogenic acid is among the constituents of raw coffee, whose content is significantly reduced by roasting. This decomposition of chlorogenic acid has hitherto been accepted, because it was looked upon as an undesired component (cf. German patent 685 367, p.1, lines 44/45).

Various processes for the production of low-caffeine or caffeine-free coffee by removing caffeine from the raw coffee are known. In these processes, the raw coffee is extracted with water or some other solvent and then using organic solvents or solid adsorbents the caffeine is removed from the extract (German patent 685 367/European patent 8398). The caffeine-free extract can optionally be added to the raw coffee again, so that the green coffee beans which undergo the roasting process fully contain all constituents other than the caffeine (German patent 685 367, p.1, lines 29 to 31). It has already been described how the caffeine can be removed from the raw coffee in such a way that it is brought into contact with an extract which is saturated with all extractable constituents, other than the caffeine. The caffeine of the raw coffee passes selectively into said extract and is subsequently withdrawn again (DE-OS 31 19 277/EP-OS 78088). This process also leads to a low-caffeine or decaffeinated raw coffee, during the roasting of which other constituents and in particular a considerable part of the chlorogenic acid are lost. In the earlier processes the chlorogenic acid is even removed during extraction as an allegedly undesired component (German patent 685 367, p.1, lines 43 to 49).

It has now been found that roasted or instant coffee with a higher content of the constituents of the raw coffee, particularly chlorogenic acid can be more easily digested and that in this way a higher weight yield of roasted coffee can be obtained from the raw coffee without any loss of taste or flavor. It has particularly surprisingly been found that chlorogenic acid is able to protect the gastric mucosa against irritations and therefore improves the digestibility of foods, beverages and modicuments, cf. the parallel German patent application P 36 03 576.9-41.

The improved digestibility is proved by a much reduced acid secretion. This reduction is clearly obtained in that the proportion of roasting substances present in any roasted coffee and whose physiological effect causes incompatibilities (heartburn, etc.), is compensated by an increased chlorogenic acid content.

Therefore the digestibility of a roasted coffee is dependent on the chlorogenic acid/roasting substance ratio in the coffee infusion. From this standpoint it would be desirable to prevent a marked reduction in the chlorogenic acid content through the roasting of the coffee. Normally the natural chlorogenic acid content of coffee is reduced by approximately 40 to 80% during roasting, so that in roasted coffee there is only about 2% by weight and at the most approximately 2.4 to 2.6% by weight of chlorogenic acid (determined by means of HPLC). Earlier works (e.g. G. Lehmann et al, Deutsche Lebensmittel-Rundschau, 63, pp. 144–151 and 273–275, 1967; G. Lehmann, Ernahrungs-Umschau 1971, pp. 43–47) admittedly report on much higher chlorogenic acid content in roasted coffee and instant coffee powders. However, the determination method used also covered other phenolic compounds and therefore yielded much higher values. All the chlorogenic acid values given in the present description and claims were obtained by the HPLC method (high pressure liquid chromatography) and are therefore approximately 50% lower than those obtained by the previously used DIN method or other earlier determination methods (cf. G. Lehmann and B. Binkle, Deutsche Lebensmittel-Rundschau 79, pp. 266–269, 1983; W. Schünemann and H. G. Maier, Deutsche Lebensmittel-Rundschau 82, pp. 73–76, 1986).

The present invention therefore relates to roasted coffee with an increased chlorogenic acid content of more than 2.8% by weight, preferably at least 3% by weight and e.g. 3.25% by weight or more, or instant coffee powders with an increased chlorogenic acid content of more than 8.5% by weight.

As has already been stated, the chlorogenic acid content of conventional roasted coffee is only approximately 2% by weight and in rare cases reaches approximately 2.4 to 2.6% by weight. Only as a result of extreme mild roasting, which no longer provides a coffee with a satisfactory flavor, could higher chlorogenic acid content be obtained.

The chlorogenic acid content range of the inventive roasted coffee, in which a positive physiological effect in the sense of better digestibility can be proved, generally starts at approximately 2.8% by weight, whilst taking account of the aforementioned relationship between the chlorogenic acid content and the roasting substance potential. The latter is dependent on the degree of roasting and the extractability of the roasted coffee. This means that percentagewise the chlorogenic acid content should be increased by at least the same amount by which in each case the roasting substance content increases (measured as a color value of the ground coffee). The color value of commercially available, normally roasted coffee varieties is approximately 90%. In the case of the roasting substance content corresponding to this color value in the infusion, according to the invention generally a chlorogenic acid content in the roasted coffee of approx- 2.8% by weight is adequate. On lowering the color value (corresponding to a rising roasting substance content), according to the invention the chlorogenic acid content must be raised by at least the same amount. If e.g. through stronger roasting the color value drops to 80, i.e. by approximately 12%, the chlorogenic acid content is preferably increased by at least 12%, i.e. to approximately 3.14% by weight, in order to effectively compensate the physiological effect of the roasting substances.

The color value determined by reflection measurement on ground roasted coffee is recognised to be a measure of the degree of roasting of coffee.

It has been found that an increased chlorogenic acid content can be achieved in different ways and the roasted coffee can contain the chlorogenic acid partly in the form of salts, particularly alkali metal salts and in particular potassium salts. In the human stomach, such salts have the same effect as free chlorogenic acid, because in the strong acid gastric medium they are largely converted into the free acid.

For producing the roasted coffee, it is possible to proceed in such a way according to the invention that by treating the raw coffee with a solvent an extract is produced, the extracted coffee and/or a non-extracted coffee charge is roasted, the optionally concentrated extract is wholly or partly added to the roasted coffee before or after grinding and the coffee is then dried. The constituents of the raw coffee extract consequently bypass the roasting ad are subject to no decomposition.

Preferably water is used as the solvent. Prior to the impregnation of the roasted coffee with the raw coffee extract, the latter is preferably concentrated, so that it has a solids content of more than 15 and in particular more than 20% by weight. The extract is sprayed or dusted onto the roasted coffee, i.e. the roasted beans or optionally also the already ground coffee. Drying then takes place to remove the moisture at approximately 60° to 120° C. and preferably at approximately 80° to 100° C., in order to remove the moisture emanating from the extract.

Approximately 25 to 28% by weight of the dry substance of green coffee beans are extractable, but according to the invention generally only approximately 5 to 8% by weight are extracted. There is no need to subsequently add the entire extract to the roasted coffee. Instead, only part of the raw coffee extract and/or specific constituents can be selected for this. For example certain selected constituents can be separated from the raw coffee extract and they are then added to the coffee again after roasting, whereas 0 to 100% of the extract left behind is again added to the raw coffee prior to roasting. In other words certain constituents are selected from the extract and added to the roasted coffee, whereas other constituents are either wholly or partly supplied again to the raw coffee, then undergo the roasting process or are completely separated and discarded.

For the separation of chlorogenic acid from raw coffee extracts, it is possible to use gel permeation chromatography, where e.g. modified polysaccharides are used, which in conjunction with water give a heteroporous, swollen network with variable pore size distribution. The fractionation of the dissolved substances normally takes place according to the molecular size. In the case of chlorogenic acid, it has been found that another mechanism must come into effect, because the acid is held much longer than would be expected on the basis of its molecular size. It therefore only appears in the final eluate fractions. The chlorogenic acid-free and the chlorogenic acid-containing eluates are separately collected and concentrated. The former are optionally added to the raw coffee and the latter to the roasted coffee produced therefrom. The chlorogenic acid contents of the roast coffee are consequently only dependent on the partial degree of extraction of the raw coffee and can be adjusted at random within this range. This simultaneously leads to a quantitative gain, as stated hereinbefore, because the material subsequently added to the roasted coffee is subject to no thermal decomposition.

Another possibility for raising the chlorogenic acid content in the roasted coffee is to extract approximately 5 to 10% by weight of the soluble constituents from the raw coffee, the resulting solution is concentrated to a solids content of e.g. 20% and without further treatment is returned to the partly extracted raw coffee redried to an average water content. The thus obtained material must again be dried to a moisture content permitting subsequent roasting. This subsequently gives a roasted coffee which, compared with untreated coffee, has an up to 0.5% by weight higher chlorogenic acid content, which is possibly a consequence of the asymmetric extract distribution over the bean cross-section occurring during raw coffee impregnation.

Another possibility is to so control the process during the extraction, that only those constituents are removed from the raw coffee which are to be subsequently added to the roasted coffee again. This can e.g. take place in such a way that for extracting the raw coffee use is made of recycled extract, which is only not saturated with respect to those constituents which are subsequently added to the roasted coffee. Only these constituents pass from the bean into the solution. They are separated from the solution using suitable separating processes, removed from the cycle and subsequently added again to the roasted coffee.

The extraction of the raw coffee within the framework of the inventive process takes place by per se known processes, such as are e.g. described in DE-OS 31 19 277.

As explained hereinbefore, a particular aspect of the invention is that with the aid thereof it is possible to obtain a roasted coffee with an increased chlorogenic acid content, in that to the roasted coffee is added a chlorogenic acid-containing extract. However, according to another embodiment of the invention it is also possible to mix roasted coffee with isolated chlorogenic acid obtained from green coffee beans or other plants (cf. in connection with the isolation process the simultaneously filed application PCT/EP 87=German patent application P 36 03 574.2-42).

According to another embodiment chlorogenic acid can also be added to the raw coffee, but it must be borne in mind that as a result of the thermal decomposition the additive must be dosed in such a way that the roasted product has a sufficiently high chlorogenic acid content in the sense of the invention.

According to another embodiment roasted coffee is roasted in graded manner with different degrees of roasting, so that the individual roasts give different chlorogenic acid contents. This gives mixtures which do not differ from the sensory standpoint from conventional coffee and whose total chlorogenic acid content is much higher than that obtained from a unitary roast. Thus, surprisingly, this procedure in the case of a relatively high color value (low degree of roasting) gives a product which from the sensory standpoint corresponds to a coffee with a standard degree of roasting. This also applies with respect to roasts from different origins and/or types and the selection thereof can take place under the standpoint of a high chlorogenic acid content in the starting material.

The process of mixing differently roasted components can be looked upon as a mixing optimization directed at increasing the chlorogenic acid content. The thus attainable chlorogenic acid increase leads to values which, for obtaining the inventive chlorogenic acid content, only require supplementing by relatively small chlorogenic acid quantities from external sources. However, it can also be obtained by suitable combinations of mixture optimization with one or more of the aforementioned process variants.

The inventive procedures can also be used for producing decaffeinated or partly decaffeinated roasted coffee, in that a raw coffee is used as a basis and then the caffeine is partly or totally removed therefrom.

Pulverulent soluble or instant coffee can also be obtained according to the invention. Commercially available instant coffee powders have chlorogenic acid contents of approximately 3.5 to 5.0% by weight, which in the case of conventional dosing leads to a chlorogenic acid content of approximately 51 to 72 mg/100 ml of coffee. Using the standard filter preparation methods, normal roasted coffee leads to a coffee beverage with approximately 130 mg of chlorogenic acid/100 ml of coffee, i.e. the chlorogenic acid content of instant coffee powders is particularly low. When using inventive roasted coffee, the coffee beverage contains chlorogenic acid contents above 160 mg/100 ml of coffee. Thus, according to the invention, at a suitable point in the process for producing instant coffee or the finished instant coffee powder, sufficient chlorogenic acid is added to ensure that a coffee with the sought higher chlorogenic acid content is obtained. It is normally necessary for this purpose to add approximately 5 to 7 and in particular approximately 6% by weight of chlorogenic acid to the instant coffee powder, so that its content is at least approximately 8.5% by weight.

The following examples without being of a limitative nature serve to further illustrate the invention. All percentages are by weight. The chlorogenic acid contents given were obtained by high pressure liquid chromatography (HPLC) with equipment (pump, spectral photometer, separation column) supplied by Messrs. Waters and an integrator supplied by Messrs. Shimadzu in the following way:

| Column: | Cartridge 8 C 1810µ |
| --- | --- |
| Injection volume: | 20 µl |
| Detection: | at 280 nm |
| Flow rate: | 1 to 4 ml/min |
| Mobile solvent: | 20 ml of tetrahydrofuran + 1 ml of glacial acetic acid ad 1000 ml of distilled water. |

The test solution was prepared by extraction of the ground starting material in the ultrasonic bath with water and filtration through a 45 µfilter. The calibration solution was a solution of 5 mg of 3-caffeoylquinic acid in 100 ml of water. The sum of the peak areas of 3-,4- and 5-caffeoylquinic acids was related to the peak area of the comparison substance for calculating the contents.

The color value was determined with a Tricolor LFM 3 calorimeter supplied by Lange-IndustriemeBgeräte. For measurement purposes, ground coffee with a standardized degree of grinding and located in a cell was irradiated under an angle of 45° by a light source and the diffuse reflected light was simultaneously detected by three photoreceivers. The value L* (DIN 6174, CIE-LAB 1976) measured on the light-dark axis was used as a measure for the color intensity of the coffee. The L* values are converted by linear regression into the color value, which is given in scale divisions (s.d.). The following three pairs of values give degrees of regression: L* 19.69/75 s.d., L* 22.30/90 s.d. and L* 25.77/110 s.d. The color of the normally roasted coffee is 90 s.d. in the described measuring process. In the case of lighter roasted coffees correspondingly higher numerical values are measured.

EXAMPLE 1

7 kg of raw coffee were extracted with 6.1 liters of water for ninety minutes at 80° C. and accompanied by constant movement. After pouring off the extract solution adhering liquid was removed from the beans by spraying with water, redried to a water content of approximately 12.5% and roasted in hot air at 240° C. The spraying water and extract solution were combined, carefully evaporated to a dry substance content of approximately 20% and this concentrate was then sprayed in a rotating flask onto the roasted coffee. The beans absorbed the solution and were then redried in the hot airflow at 90° C. to a residual water content of approximately 3%. A non-extracted comparison sample of the starting material was roasted directly in the manner described hereinbefore. Both coffees were then brought to the same degree of roasting for sensory comparability purposes and the color value measurement was used as a measure for the degree of roasting. The following Table 1 gives the analytical data obtained on a comparative basis.

TABLE 1

|  | Chlorogenic acid content % d.s. * | Extract content % d.s. * | Colour value |
| --- | --- | --- | --- |
| Inventively treated roasted coffee | 3.19 | 27.1 | 92 |
| Untreated roasted coffee | 2.08 | 26.8 | 90 |

* d.s. = in dried substance

Compared with the untreated product, the inventively treated product had an approximately 50% higher chlorogenic acid content and, in spite of the higher acid content, the infusion had a surprisingly mild taste and from the sensory standpoint was comparable with the untreated sample.

EXAMPLE 2

7 kg of raw coffee were extracted with water as described in example 1. The resulting extract solution was treated with a cation exchanger in the $H^+$ form and consequently brought to a pH-value of 2.3. After concentrating the solution to an extract content of approximately 20%, it underwent gel permeation chromatography for separating chlorogenic acid. In this case the separating medium was a relatively low cross-linked dextran marketed under the trademark "SEPHADEX G 25" (Pharmacia A.B.). For this purpose the sample solution was firstly fed onto the gel bed, whilst maintaining a sample to gel volume ratio of 1:5. Elution took place with desalted, degassed water having a delivery rate of 1 liter of water/liter of gel bed x h for a gel bed volume of 15 liters.

As a result of the unexpected affinity evolved by the chlorogenic acid with respect to the dextran matrix, as described hereinbefore, it is more slowly eluted than would have been expected on the basis of its molecular size and leaves the column virtually after all the other extract constituents. The latter were therefore collected as the first fraction, whereas the second fraction mainly contained the chlorogenic acid isomers. The purity of the isomeric mixture in the second fraction was approximately 80%. Both fractions were carefully concentrated to a concentration of in each case approximately 20%.

The partly extracted raw coffee was redried to a water content of approximately 12 to 15% and impregnated with the almost chlorogenic acid-free concentrate of the first fraction by spraying at 50° C. in the rotating flask. Over a period of approximately one hour, the beans absorb the extract solution. Then again approximately 0.5 liter of water was sprayed on in approximately 30 minutes, which led to a further absorption in the interior of the bean of also the externally adhering extract residues. After hot air drying at approximately 90° C. to a residual moisture content of 14%, the beans were roasted in a hot airflow at 240° C. to a color value of 90 scale divisions. The concentrated chlorogenic acid solution was then sprayed onto the still warm roasted beans in the rotating flask and the beans were then redried in the hot airflow at 90° C. The results compared with the untreated, directly roasted coffee are given in Table 2.

TABLE 2

| | Chlorogenic acid content % d.s. * | Extract content % d.s. * | Colour value |
|---|---|---|---|
| Inventively treated roasted coffee | 3.30 | 27.8 | 93 |
| Untreated roasted coffee | 2.08 | 26.8 | 91 |

EXAMPLE 3

From 1.1 kg of raw coffee with a chlorogenic acid content of 5.5% in the dry substance, by extracting three times with in each case 4.1 liters of water at 80° C., an extract solution was prepared, which was carefully concentrated for extracting chlorogenic acid, adjusted with hydrochloric acid to pH=2, filtered and subject as a roughly 20% solution to gel permeation chromatography, as described in example 2. As the chloride ions appear in the first eluate, which was in this case discarded, acidification could take place with hydrochloric acid. The chlorogenic acid fraction was separately collected and concentrated to an approximately 20% dry substance content. 280 ml of this solution, whose chlorogenic acid content was approximately 18%, was sprayed onto 4 kg of an otherwise untreated roasted coffee and the material was redried to an approximately 3% water content in the hot airflow at 80° C. Based on the given roasted coffee quantity, the chlorogenic acid addition amounted to approximately 1.3%. The analytical results compared with the untreated roasted coffee are given in Table 3.

TABLE 3

| | Chlorogenic acid ontent % d.s. * | Extract content % d.s. * | Colour value |
|---|---|---|---|
| Inventively treated roasted coffee | 3.28 | 28.4 | 91 |
| Untreated roasted coffee | 2.10 | 27.1 | 92 |

EXAMPLE 4

Roasts graded by the degree of roasting and prepared with correspondingly differing chlorogenic acid contents were produced from raw coffees from Colombia, Tanzania and Kenya and mixture A in Table 4 was formed therefrom. Mixture H was obtained in a similar manner, but consisted solely of Colombia coffee roasts.

In each case 4 kg of mixtures A and H were then, as described in example 3, impregnated with a 20% chlorogenic acid solution and redried. Table 4 gives the in each case added quantities of chlorogenic acid and the obtained, i.e. analytically found percentage contents.

The chlorogenic acid addition, based on the given roasted coffee mixture was 0.5% for mixture A and approximately 0.4% for mixture H. The percentages under "rise found" relate to the chlorogenic acid content of the Colombia coffee used for comparison purposes.

TABLE 4

| Sample | | | Colour value mixture Found | Chlorogenic acid content | | | Chlorogenic acid | |
|---|---|---|---|---|---|---|---|---|
| | | | | Calculated % d.s. * | Found % d.s. * | Rise found % | Addition g/4 kg | Content found % d.s. * |
| Colombia - comparison | | | 92 | — | 2.13 | — | — | — |
| Mixture A | Chlorogenic acid content % d.s. * | Colour value % d.s. * | 102 | 2.82 | 2.80 | +31.5 | 22 | 3.30 |
| 35% Colombia | 2.13 | 92 | | | | | | |
| 30% Tanzania | 3.35 | 114 | | | | | | |
| 35% Kenya | 2.98 | 110 | | | | | | |
| Mixture H | Chlorogenic acid content % d.s. * | Colour value % d.s. * | 131 | 2.95 | 2.88 | +35.2 | 18 | 3.32 |
| 50% Colombia | 3.17 | 126 | | | | | | |
| 25% Colombia | 1.66 | 79 | | | | | | |
| 25% Colombia | 3.78 | 155 | | | | | | |

* = in dried substance
s.d. scale divisions

Physiological tests

In a test series the influence of different coffee samples on the human gastric acid secretion was investigated. Each test subject received approximately 250 ml of the individual coffee samples in random double-blind crossover form. The test subjects were healthy males and females aged between 19 and 35. After fasting for twelve hours, the test subjects were fitted in the morning with a naso-gastral probe by means of which the gastric juice was initially quantitatively removed at time $t_0$. Quantitative removal then took place at 15 minute intervals over the following sixty minutes $t_{0-60}$ for determining the basal acid secretion of the new formed gastric juice. On five different test days, which were at least two days apart, the test subjects received in each case 250 ml of coffee types 1 to 5 or I to IV. The return of the gastric juice removed at time 0 took place before the test subjects received the different coffee types within a ten minute period. The probe was used for removing in each case 5 ml of gastric juice 10 and 30 minutes after the start of coffee drinking. Between the 30th and 150th minutes, there was once again a quantitative removal of the gastric juice at 15 minute intervals. The titratable acid was determined with 0.1 n NaOH in these samples and in Tables 6 and 7 the values found are given in ml of NaOH. The volume of the removed gastric juice is given in ml in Tables 6 and 7.

The period $t_{60-150}$ or $t_{60-210}$ was used for the comparative evaluation of the results because, as is known, other effects are superimposed in the first 60 minutes after ingestion. The values found were obtained by intraindividual evaluation, the dispersion according to the following equation was calculated for the mean values:

$$SEM = \sqrt{\frac{(x_i - \bar{x})^2}{N(N-1)}}$$

$x_i$ = individual values
$\bar{x}$ = mean values
$N$ = number of mean values

Coffee samples 1 to 5 had an identical degree of roasting and only differed through rising chlorogenic acid quantities (Table 5), samples 3 to 5 corresponding to the invention. As is shown by the results given in Table 6, coffee 1 led to the highest acid stimulation, but with rising chlorogenic acid content there was a significant decrease in gastric acid secretion. Volume secretion also decreases in the order of coffee types 1 to 5. There is a clear influence of chlorogenic acid on the reduction of the human gastric acid secretion stimulated by coffee roasting substances.

Coffee types I to IV had different degrees of roasting (color values), extract and chlorogenic acid content (Table 5). The extract of the individual samples was determined, in that in each case 100 ml of the coffee infusion (prepared as for the administration to the test subjects) was evaporated to dryness. The dry residue obtained is given as an extract in g/100 ml of coffee. The results of Table 7 show that coffee sample IV gives the lowest acid stimulation. Compared with coffee sample IV, samples III, II and I lead to a much higher gastric acid secretion, the non-inventive sample III being the least favorable and this also applies as regards to the volume secretion. The results make it clear that there is a connection between the degree of roasting and the extract on the one hand and the chlorogenic acid content on the other and that a higher chlorogenic acid content must correspond to a high roasting substance content in the infusion, in order to achieve a very low gastric acid secretion and therefore an improved compatibility.

Coffee samples A to D (Table 5) differ either with regards to the degree of roasting or, with the same degree of roasting, as regards the chlorogenic acid content. Comparison between samples A and D shows that a higher roasting substance content (lower color value corresponding to a higher degree of roasting and higher extract) for the same chlorogenic acid content leads to increased acid secretion. However, samples B and C prove that in the case of coffees with an identical roasting substance content, the sample with the higher chlorogenic acid content leads to a much lower gastric acid secretion.

TABLE 5

| Coffee No. | Chlorogenic acid content mg/100 ml of coffee | Extract content (g/100 ml of coffee) | Degree of roasting (colour value) |
|---|---|---|---|
| 1 | 110.0 | | |
| 2 | 134.3 | | |
| 3 | 156.8 | | |
| 4 | 178.1 | | |
| 5 | 188.1 | | |
| I | 193 | 1.51 | 84 |
| II | 149 | 1.41 | 110 |
| III | 105 | 1.32 | 85 |
| IV | 194 | 1.63 | 87 |
| A | 124 | 1.36 | 90 |
| B | 98 | 1.37 | 75 |
| C | 124 | 1.38 | 75 |
| D | 124 | 1.49 | 60 |

TABLE 6

Cumulative gastric acid secretion and gastral volume secretion between the 60th and 150th minute after taking coffee (250 ml of coffees 1 to 5) in the case of 10 healthy test subjects (intraindividual evaluation).

| | Gastric acid secretion | | Gastral volume secretion | |
|---|---|---|---|---|
| Coffee No. | $t_{60-150}$ | % increase compared with coffee 5 | $t_{60-150}$ | % increase compared with coffee 5 |
| 5 $\bar{x}$ SEM | 36.6 ± 6.70 | | 69.8 ± 8.29 | |
| 4 $\bar{x}$ SEM | 39.4 ± 6.91 | 7.6% | 77.8 ± 8.66 | 11% |
| 3 $\bar{x}$ SEM | 51.0 ± 8.49 | 39% | 87.2 ± 11.23 | 25% |
| 2 $\bar{x}$ SEM | | 45% | 90.6 ± 19.16 | 30% |
| 1 $\bar{x}$ SEM | 64.5 ± 5.96 | 76% | 101.1 ± 8.28 | 45% |

TABLE 7

Cumulative gastric acid secretion and gastral volume secretion between the 60th and 150th minute after taking coffee (250 ml of coffees I to IV) in the case of 10 healthy test subjects (intra-individual evaluation).

| Coffee No. | Gastric acid secretion | | Gastral volume secretion | |
|---|---|---|---|---|
| | $t_{60-150}$ | % increase compared with coffee IV | $t_{60-150}$ | % increase compared with coffee IV |
| IV $\bar{x}$ SEM | 48.3 ± 7.0 | | 78.2 ± 6.6 | |
| III $\bar{x}$ SEM | 66.7 ± 9.0 | +38% | 85.7 ± 6.7 | +10% |
| II $\bar{x}$ SEM | 55.3 ± 8.0 | +15% | 81.4 ± 9.0 | +4% |
| I $\bar{x}$ SEM | 54.0 ± 7.0 | +12% | 84.1 ± 8.5 | +8% |

TABLE 8

Cumulative gastric acid secretion and gastral volume secretion between the 60th and 210th minute after taking coffee (250 ml of coffees A to D) in the case of 10 healthy test subjects (intra-individual evaluation).

| Coffee No. | Gastric acid secretion | | Gastral volume secretion | |
|---|---|---|---|---|
| | $t_{60-210}$ | % increase compared with coffee A | $t_{60-210}$ | % increase compared with coffee A |
| A $\bar{x}$ SEM | 74.3 ± 15.3 | | 147.4 ± 14.6 | |
| B $\bar{x}$ SEM | 85.2 ± 12.0 | 14.6% | 179.4 ± 12.1 | 21.7% |
| C $\bar{x}$ SEM | 75.9 ± 11.0 | 2.2% | 137.4 ± 5.6 | -6.8% |
| D $\bar{x}$ SEM | 86.4 ± 13.4 | 16.3 | 151.6 ± 15.2 | 2.8% |

We claim:

1. Roasted coffee with a chlorogenic acid content of more than 2.8% by weight, as determined by high pressure liquid chromatography (HPLC), or an instant coffee powder with a chlorogenic acid content of more than 8.5% by weight, as determined by HPLC, said chlorogenic acid content being higher than the content naturally occurring in said roasted coffee or coffee powder and wherein said higher content improves the digestion process.

2. Coffee according to claim 1, wherein the percentage chlorogenic acid content is increased by at least the same amount by which the roasted substance content increases in the infusion (measured as a color value of the ground coffee), based on a chlorogenic acid content of approximately 2.8% by weight at a color value of approximately 90.

3. Coffee according to claims 1, wherein said coffee contains the chlorogenic acid at least partly in the form of salts.

4. Process for producing roasted coffee with an increased chlorogenic acid content of more than 2.8% by weight, as determined by high pressure liquid chromatography, comprising the steps of treating raw coffee with a solvent to prepare an extract, roasting the extracted coffee and/or a non-extracted coffee charge, adding the extract wholly or partly to the roasted coffee before or after grinding, in order to produce a roasted coffee which has an increased chlorogenic acid content of more than 2.8% by weight, and drying the coffee.

5. Process according to claim 4, wherein water is used as the solvent.

6. Process according to claim 4, wherein the raw coffee extract is concentrated to a solids content of more than 15% by weight before adding said extract to the roasted coffee.

7. Process according to claim 4, wherein drying takes place at 60° to 120° C.

8. Process according to claim 4, wherein the constituents which are to be added again to the roasted coffee are separated from the raw coffee extract, while 0 to 100% of the extract left behind is again added to the raw coffee prior to roasting.

9. Process according to claim 4, wherein a recycled extract is used for extracting the raw coffee, which recycled extract is not solely saturated with respect to the constituents to be subsequently added to the roasted coffee, and the constituents are subsequently separated.

10. Process according to claim 4, wherein a chlorogenic acid-containing extract is prepared and at least part of the extracted chlorogenic acid is added to the roasted coffee.

11. Process for the production of roasted coffee according to any one of claims 1 to 3, wherein isolated chlorogenic acid is added to the roasted coffee.

12. Process for the production of roasted coffee according to claim 3, wherein the chlorogenic acid is added to the roasted coffee at least partly in the form of salts.

13. Process for producing roasted coffee with an increased chlorogenic acid content of more than 2.8% by weight, as determined by HPLC, comprising the steps of treating raw coffee with a solvent to prepare an extract, re-drying the extracted coffee to an average water content, reimpregnating it with the concentrated extract, redrying it to the residual moisture content and then roasting the coffee.

14. Process for producing roasted coffee with an increased chlorogenic acid content of more than 2.8% by weight, as determined by HPLC, in which decaffeinated or partly decaffeinated raw coffee is used as the starting material.

* * * * *